(12) United States Patent
Holste

(10) Patent No.: US 9,795,130 B2
(45) Date of Patent: Oct. 24, 2017

(54) COLLAPSIBLE WATERFOWL DECOY APPARATUS

(71) Applicant: Christopher Holste, Lakeville, MN (US)

(72) Inventor: Christopher Holste, Lakeville, MN (US)

(*) Notice: Subject to any disclaimer, the term of this patent is extended or adjusted under 35 U.S.C. 154(b) by 53 days.

(21) Appl. No.: 14/809,154

(22) Filed: Jul. 24, 2015

(65) Prior Publication Data

US 2016/0021871 A1 Jan. 28, 2016

Related U.S. Application Data

(60) Provisional application No. 62/029,457, filed on Jul. 26, 2014.

(51) Int. Cl.
*G01P 13/02* (2006.01)
*A01M 31/06* (2006.01)

(52) U.S. Cl.
CPC .......... *A01M 31/06* (2013.01); *G01P 13/02* (2013.01)

(58) Field of Classification Search
None
See application file for complete search history.

(56) References Cited

U.S. PATENT DOCUMENTS

| | | |
|---|---|---|
| 4,251,937 A | 2/1981 | Curley |
| 4,651,458 A | 3/1987 | Lanius |
| 5,608,983 A * | 3/1997 | Adams ............... A01M 31/06 43/3 |
| 6,050,017 A * | 4/2000 | Barry ................. A01M 31/06 43/2 |
| 6,374,530 B1 | 4/2002 | Mierau |
| 6,412,210 B1 | 7/2002 | Horrell |
| 6,584,721 B1 | 7/2003 | Reule |
| 6,782,653 B1 | 8/2004 | Thomas |
| 7,028,429 B1 | 4/2006 | Druliner |
| D553,025 S | 10/2007 | Kuzmin |
| 7,631,456 B2 | 12/2009 | Butz |
| 7,739,826 B1 | 6/2010 | Druliner |
| 2005/0144828 A1 | 7/2005 | Lewis |
| 2012/0198753 A1 | 8/2012 | Idstrom |
| 2013/0283664 A1 | 10/2013 | Kelly |

(Continued)

OTHER PUBLICATIONS

Whiterock Decoys Website displaying decoy hinging mechanism. Attached as NPL_1_WRD_website.pdf.

(Continued)

*Primary Examiner* — Andre Allen
(74) *Attorney, Agent, or Firm* — William J. Delfs

(57) ABSTRACT

A waterfowl decoy apparatus comprising a vertical shaft, a hinging mechanism that is movable between a deployed position and a closed position mechanically connected to the vertical shaft, a windsock support structural member having a first end pivotally connected to the hinging mechanism and a windsock slidably connected to the windsock support structural member. When the hinging mechanism is in the deployed position, the windsock support structural member and the windsock is perpendicular to the vertical shaft. When the hinging mechanism is in the closed position, the windsock support structural member and windsock is parallel to the vertical shaft.

12 Claims, 8 Drawing Sheets

(56) References Cited

U.S. PATENT DOCUMENTS

2015/0000174 A1* 1/2015 Elder .................... A01M 31/06
  43/2
2015/0027028 A1* 1/2015 Steinberg .............. A01M 31/06
  43/2

OTHER PUBLICATIONS

Dakota Decoy Website displaying windsock decoy apparatus. Attached as NPL_2_Dakota_Decoy_website.pdf.
Sillosock website displaying windsock decoy apparatus. Attached as NPL_3_Sillosocks_website.pdf.
Deadly Decoys website displaying headless decoy configuration commercial offering utilizing Patent D553025. NPL_4_Deadly_headless_pdf.
Deadly Decoys website displaying decoy with head configuration commercial offering utilizing Patent D553025. Attached as NPL_5_Deadly_with_head_pdf.
Deadly Decoys website displaying decoy with feeder head configuration commercial offering utilizing Patent D553025. Attached as NPL_6_Deadly_feeder_head.pdf.
Slammer-brand, Tanglefree model of snowgoose decoy (p. 1) and the Tanglefree windsock support mechanism (p. 2) as displayed on commercial website: http://www.canadianwaterfowlsupplies.com/products/tanglefree-snow-goose-slammer-sock. Attached as NPL7_Tanglefree.pdf.

* cited by examiner

COLLAPSIBLE WATERFOWL DECOY APPARATUS

CROSS REFERENCE TO PENDING APPLICATIONS

This application claims the benefit of U.S. Provisional Application No. 62/029,457, filed Jul. 26, 2014.

FIELD OF THE INVENTION

The present disclosure relates to an apparatus used to attract migrating waterfowl for hunting purposes.

BACKGROUND OF THE INVENTION

Typical decoys for attracting waterfowl for hunting purposes include solid-body designs, solid-body designs with interchangeable heads and wings, solid-body designs with moving heads and wings, and windsock designs with a ground stake and a fabric sock printed to mimic waterfowl coloring. To aid in the attraction of waterfowl for hunting purposes, multiple decoys are placed in a field to mimic a grounded flock. This grounded flock of decoys may then attract flying flocks to land, placing the live birds in closer proximity to the concealed hunter. It is thought that the larger the size of the simulated grounded flock, the more appealing the landing and hunting site are to migrating waterfowl. Solid-body designs are large, and thus cumbersome to transport and display many decoys. Windsock decoys offer a smaller, lighter, and more portable alternative to solid-body designs, but may not sufficiently mimic real birds. Another problem encountered by hunters employing windsock decoys are the decoys becoming tangled during transport and storage in cases where they may be deploy in carrying bags while being transported to the hunting site.

BRIEF SUMMARY OF THE INVENTION

In one or more embodiments, an apparatus may include a cylinder or rod of rigid material with one end designated for insertion into the ground to anchor the decoy, an opposite end secured to a hinging mechanism with a decoy head fixation means, and an integrated striking surface to aid in the insertion of the apparatus into the ground. The hinging mechanism is secured to a second cylinder or rod that is used for mounting a fabric windsock with a printed pattern resembling the body of a stationary bird. The decoy head fixation means serves as a location for mounting an interchangeable decoy head to aid in the attraction of waterfowl.

DETAILED DESCRIPTION OF THE INVENTION

Figure 1:
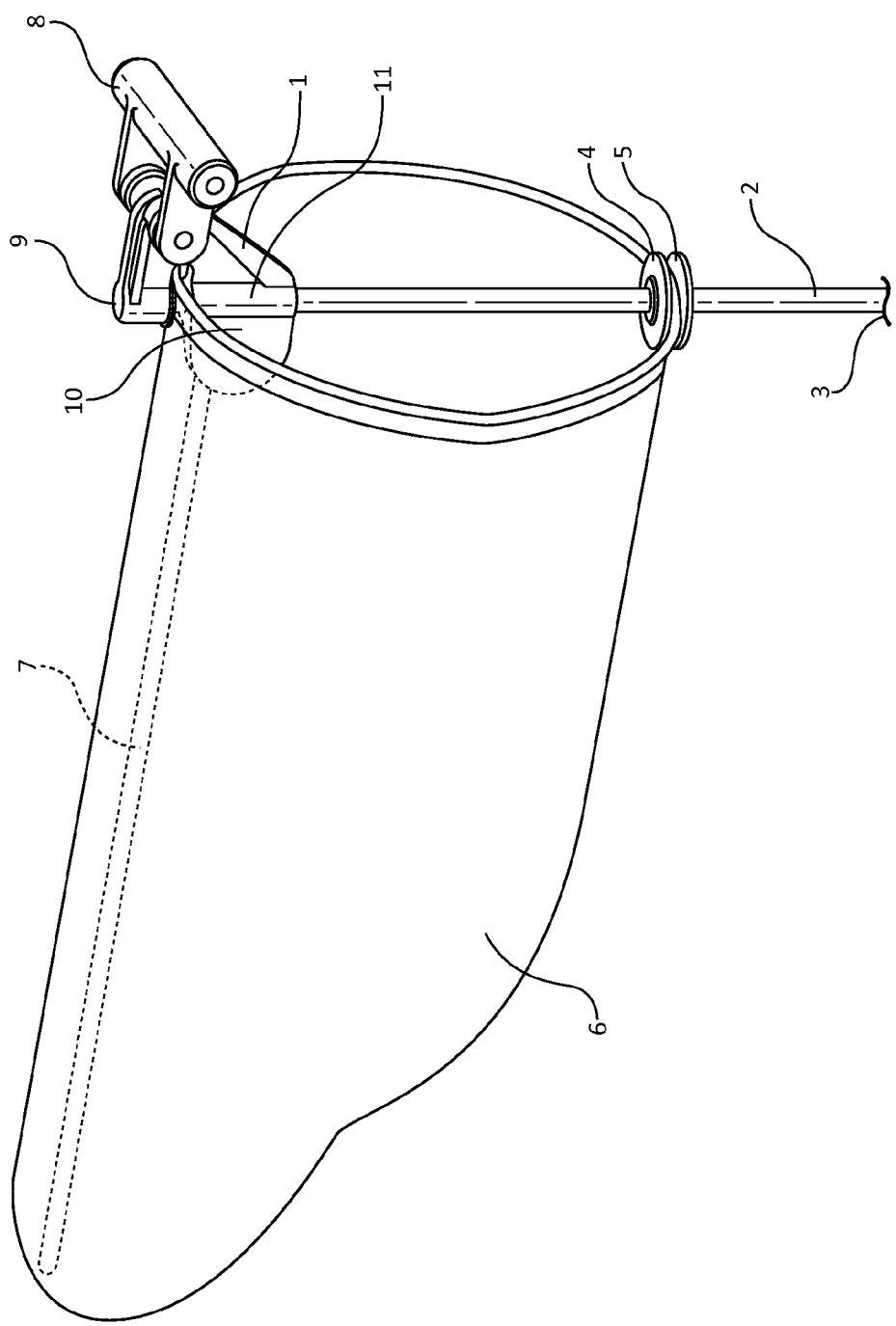
FIG. 1 is a perspective drawing of a collapsible waterfowl apparatus with a windsock, hinging mechanism, and required components locked in the open position.

The task of hunting waterfowl may include the deployment of multiple decoys to represent a flock of grounded birds. Solid body decoys carved from wood were the original method of attracting flocks of waterfowl, but these decoys are expensive to produce, cumbersome to deploy, and difficult to handle large quantities. Windsock decoys were one innovation to solve the inherent problems of solid body decoys. Windsock decoys tether a fabric windsock colored to simulate a game bird to a stake that is inserted into the ground for anchoring the decoy apparatus. Windsock decoys are less expensive to produce and smaller and lighter than solid body decoys, but may lack realistic resemblance to living waterfowl. In storage, windsock decoys often deploy and become tangled and difficult to use when needed. In the field, windsock decoys often revert to their stored state or fall out of the ground due to their construction of lightweight elements. It is also desirable to have a secure means to attach solid body heads, a compromise between windsock and solid body decoys to balance ease of use and realism.

The present disclosure, in some embodiments, includes a collapsible windsock waterfowl decoy apparatus with an integrated hinging mechanism comprising a connecting means for an anchoring rod or cylinder, a handle for manipulating the decoy apparatus, a striking surface for inserting the anchoring rod or cylinder into the ground, a means for installing an optional and interchangeable decoy head, and a second connecting means attached to a rod or cylinder for securing a fabric windsock that mimics the body of waterfowl. The hinging mechanism contains locking positions to prevent a bag of decoys from opening and entangling in storage and transport, and is coupled to a solid body that serves as a striking surface so a user can insert the windsock shaft with sufficient force to penetrate frozen ground, including striking it with a hammer, without damaging the apparatus. The decoy head fixation means is movable to allow for a wide range of orientations to realistically simulate a flock of birds in motion. Lastly, the windsock itself is designed with specific proportions to promote movement in a prevailing wind. This causes the decoys to continuously move in directions different than just the direction of the wind. The result is a "flock" of wagging windsocks pointed in different directions, as opposed to a regiment of aligned windsocks pointing in the direction of the prevailing wind.

The present disclosure, in some embodiments, relates to a waterfowl decoy apparatus comprising a vertical shaft with a ground insertion end and two washers for securing a fabric windsock. When the decoy is deployed, a horizontal windsock support structural member of equal or lesser length to an interchangeable windsock connects to a hinging mechanism that serves to couple the vertical shaft and the horizontal windsock support structural member. The horizontal windsock support structural member is used to thread and secure a fabric windsock to provide support for the windsock in the absence of wind and additional support to promote the rotation of the entire apparatus in the direction of a prevailing wind. One end of the horizontal windsock support structural member is connected by a mechanical means to the hinging mechanism. The horizontal windsock support structural member extends at a perpendicular angle to the vertical shaft when the decoy is deployed and at an angle parallel to the vertical shaft when the decoy is stored.

The hinging mechanism contains two positive stops, one for the open position and one for the closed position. These positive stops serve to lock the horizontal windsock support structural member open, or extended for hunting, or in a closed position for storage. In angular terms, the horizontal windsock support structural member extends at an angle perpendicular to the vertical shaft when the hinging mechanism is locked open, and at an angle parallel to the vertical shaft when the hinging mechanism is locked closed. Locking the decoy in the closed position prevents the decoy from opening during storage and becoming entangled with other decoys being stored in the same container or location, e.g. the trunk of a car or the bed of a pick-up.

The hinging mechanism, according to some embodiments, will be coupled to the horizontal windsock support structural member through a fastening means connecting two pieces to achieve the rotation between the vertical, stored position and horizontal deployed position. The fastening means may be a functional mechanical rotation means, constructed from one or more of the group consisting of: machine screws, cap screws, shoulder screws, captive panel screws, ball screws, nails, threaded bolts, T-handle bolts, binding posts, ball bearings, collar bearings, axle shafts in collars, rotary actuators, threaded rods, screw conveyors, pipes and pipe hangars, and pipes in bores. Other options include a setscrew and pilot hole, a self-tapping screw, or a bolt and nut combination. Materials of construction of the hinging mechanism include one or more of the materials selected from the group comprising: injection molded plastic, machined plastic, blow-molded plastic, spin-cast plastic, printed polymer component from an additive manufacturing process, reaction injection molded plastic, thermoformed plastic, polymer foam, fiberglass resin, cured carbon fiber, machined metal, injection molded metal, porcelain, and clay. Polyamide polymers such as the Nylon™ family are well suited to the wide temperature range encountered by snow goose hunters.

More specifically, the hinging mechanism may contain a decoy head fixation means that allows a user to combine an embodiment of the present disclosure to separate decoy heads to aid in attracting waterfowl. The decoy head fixation means may be coupled to the hinging mechanism through a mechanical rotation means. This serves to position the heads of multiple decoys in different orientations to more accurately simulate a flock of live birds. The decoy head fixation means of exemplary embodiments is constructed in the shape of a letter-T. The decoy head fixation means, coupled to the hinging mechanism according to some embodiments, provides additional means for grasping and inserting the decoy apparatus into the ground. Specifically, the decoy apparatus can be grasped by the decoy head fixation means with the hinging mechanism in an open position without obstructing the flow of wind through the windsock. More specifically, the positive stops of the hinging mechanism allow the windsock to be handled by the decoy head fixation means with minimal risk of rotating the hinging mechanism from closed to open, or vice versa.

Having a decoy head fixation means coupled to the hinging mechanism provides handling advantages for the removal of the decoy apparatus from the ground. For removal, the user may grasp the apparatus by the head fixation means, remove the apparatus from the ground, and then rotate the windsock support structural member from open to closed. Alternatively, the rotation from open to closed could occur while the vertical shaft and decoy apparatus are still in the ground. Grasping the apparatus by the decoy head fixation means provides a closer lever point to the user than the shaft, will prevent interfering circular rotation resulting from prevailing winds, and facilitates the open to closed rotation of the hinging mechanism while standing instead of kneeling into wet or cold ground.

Some embodiments of the presently disclosed hinging mechanism may have an integrated striking surface connected to an end of the vertical shaft opposite of the ground insertion end, in a vertical plane with the vertical anchoring shaft. The integrated striking surface is a mass of material designed to absorb a strike from a hammer in the downward direction to facilitate the installation of the presently disclosed decoy apparatus with a hammer. The integrated striking surface can be struck by a hammer to insert the vertical shaft into the ground without contacting the horizontal windsock support structural member, the vertical anchoring shaft, the decoy head fixation means, or the printed windsock. Because the snow goose hunting may be done in areas with frozen ground, the insertion of the decoy apparatus in the ground may require more force than the push of a hand. Because the integrated striking surface is a solid mass of material, it also serves as an area for gripping and pushing against the decoy when the apparatus is installed with the push of a user's hand.

According to some embodiments, the dimensions of a windsock apparatus are altered to mimic living waterfowl. An example embodiment has a narrow inlet, a widening body, and a tapered tail. This serves to impart self-supporting characteristics in the absence of wind to inflate the windsock apparatus. The tail section narrows so that when the windsock apparatus moves side-to-side, the movement is limited by the horizontal windsock support structural member on the inside of the windsock apparatus. A tail opening that is seven inches wide provides the effect of wagging for a windsock decoy. This limits the rotation to seven inches from 0 degrees before the windsock apparatus collides with the horizontal windsock support structural member. The windsock-to-horizontal windsock support structural member collision reduces the speed of the rotation, slows it, and sends it in the opposite direction. The resulting side-to-side movement is a waddle of the windsock, closely mimicking the movements of a living waterfowl. A tail opening that is too wide (large diameter exit hole of the windsock) will catch more wind, resulting in a faster and more forceful side-to-side swing—too fast to be from an actual bird. A tail opening that is too narrow (smaller exit hole of the windsock) may not catch adequate wind to trigger a side-to-side movement and will not simulate a moving, living, bird. The windsock apparatus may be constructed from one or more of the materials selected from the group consisting of: Tyvek™, canvas, Nylon™, Rayon™, Kevlar™, leather, PVC, polyester, vinyl, polymer-coated cloth, polyethylene, polypropylene, cotton, polymer foam, and fabric with a UV-resistant coating.

A hinging mechanism 1 for a windsock decoy apparatus is shown in FIG. 1. The hinging mechanism 1 is connected to a vertical shaft 2 with a ground insertion end 3 and two washers 4, 5 for securing a fabric windsock 6. The hinging mechanism 1 is also connected to a horizontal windsock support structural member 7. The hinging mechanism includes a decoy head fixation means 8 and an integrated striking surface 9 connected to an end of the vertical shaft 2 opposite of the ground insertion end 3. A first positive stop 10 for securing the windsock 6 and the horizontal windsock support structural member 7 in the open position, and a second positive stop 11 securing the decoy apparatus in the closed position are molded into the body of the hinging mechanism 1.

Figure 2:
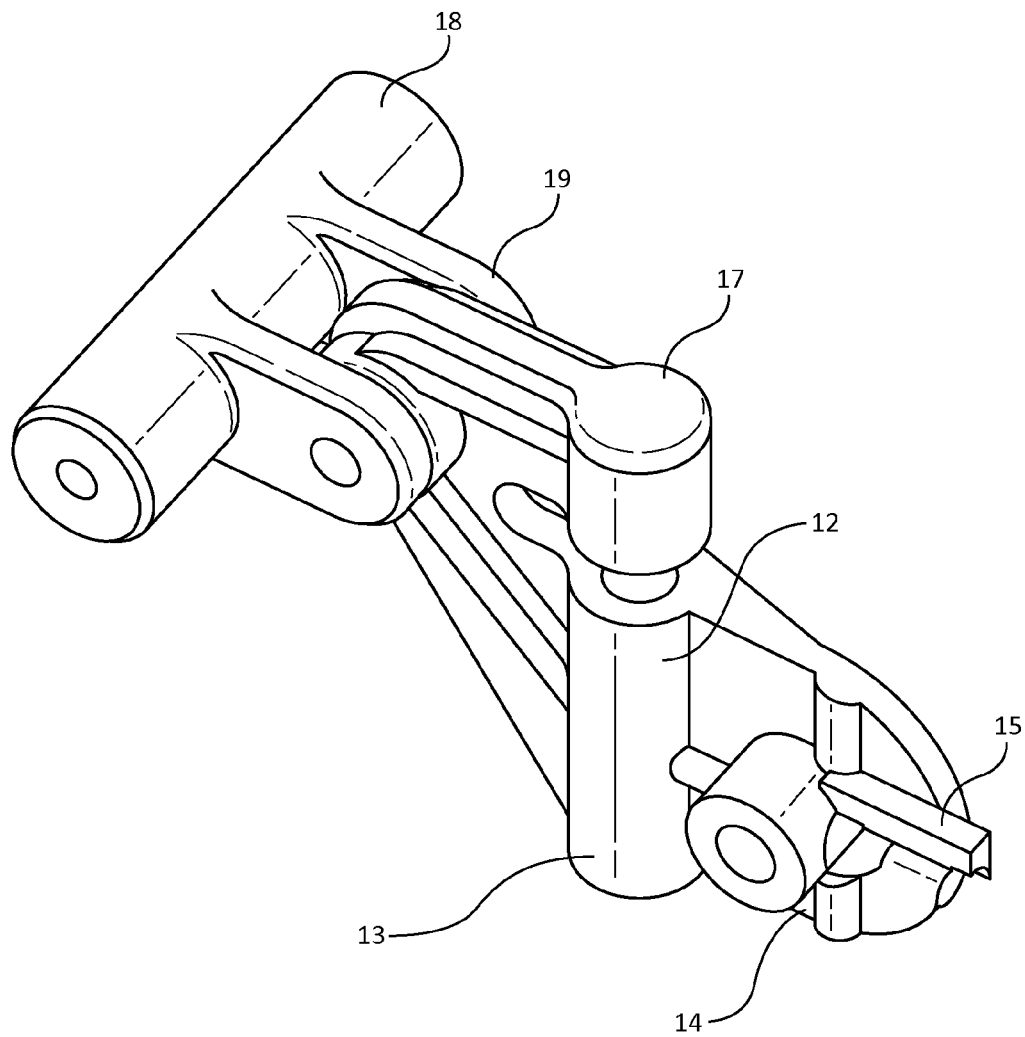
FIG. 2 is an isometric drawing of a hinging mechanism with positive stops for locking in the open and closed position, as well as an attached decoy head fixation means.

An isometric view of a hinging mechanism 12 without the required shafts, support members, and windsock is depicted in FIG. 2. The hinging mechanism 12 has an integrated means 13 for coupling to a vertical shaft. The positive stop for the closed position 14 is perpendicular to the positive stop for the open position 15 and are separate from the mechanical rotation means 16 for moving the horizontal windsock support structural member (not shown) between the open and closed positions. The method of construction for the exemplary embodiment depicted in FIG. 2 is injection-molded polymer. The integrated striking surface 17 is molded in inline with the location of the vertical shaft to direct the downward force from a hammer in the required direction for a fast insertion into the ground. The decoy head fixation 18 means is a separate, piece constructed from injection molded-polymer. An opening 19 for its mechanical rotation means has been included in the molded design.

Figure 3:
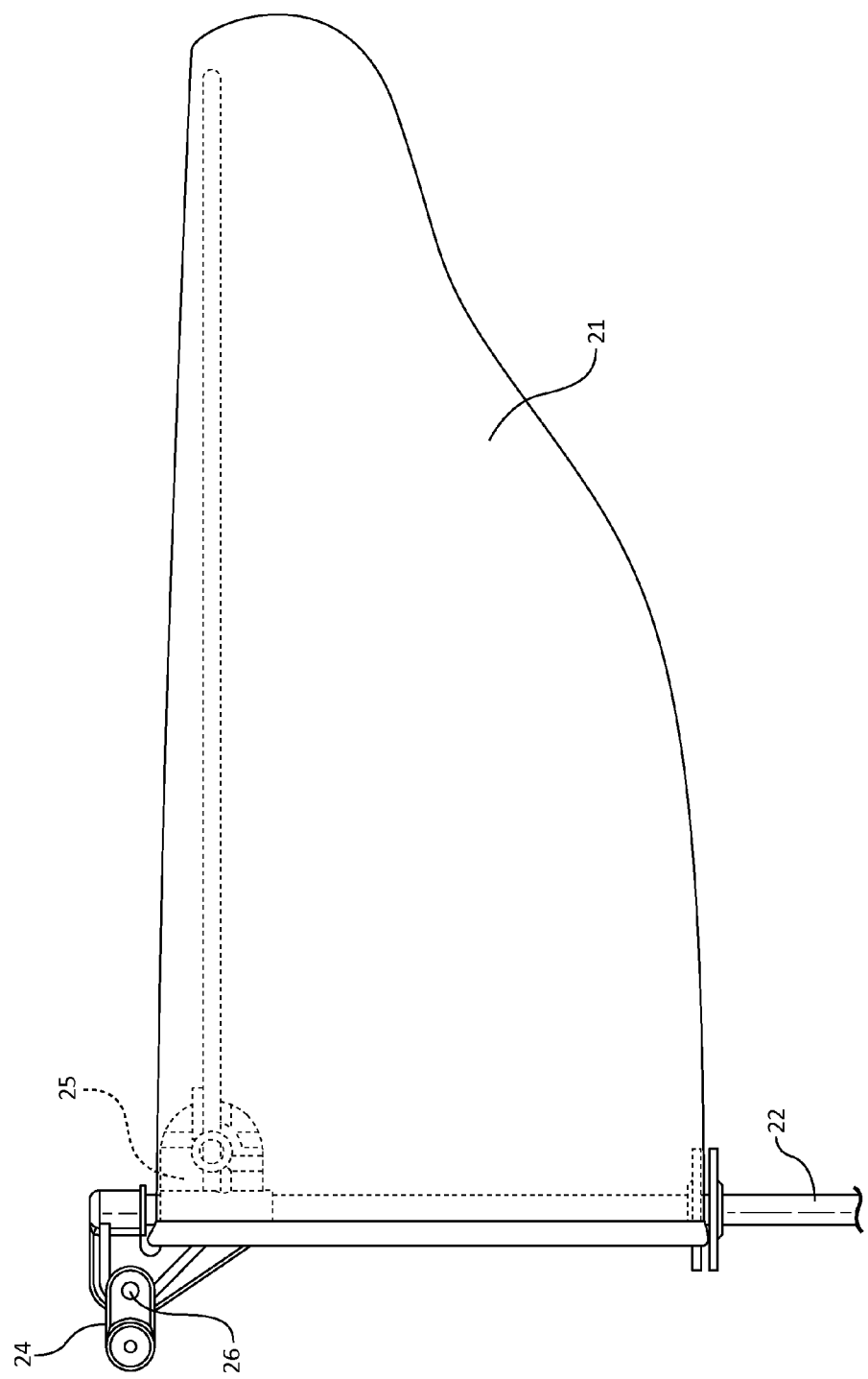
FIG. 3 is a side view of a windsock with a locking hinging mechanism in the open position.

A collapsible waterfowl decoy apparatus 20 in the open position is depicted in FIG. 3. The installed windsock 21 obscures the view of the horizontal windsock support structural member. The horizontal windsock support structural member is perpendicular to the vertical shaft 22. The decoy head fixation means 24 is coupled to the hinging mechanism 25 with a mechanical rotation means 26.

Figure 4:
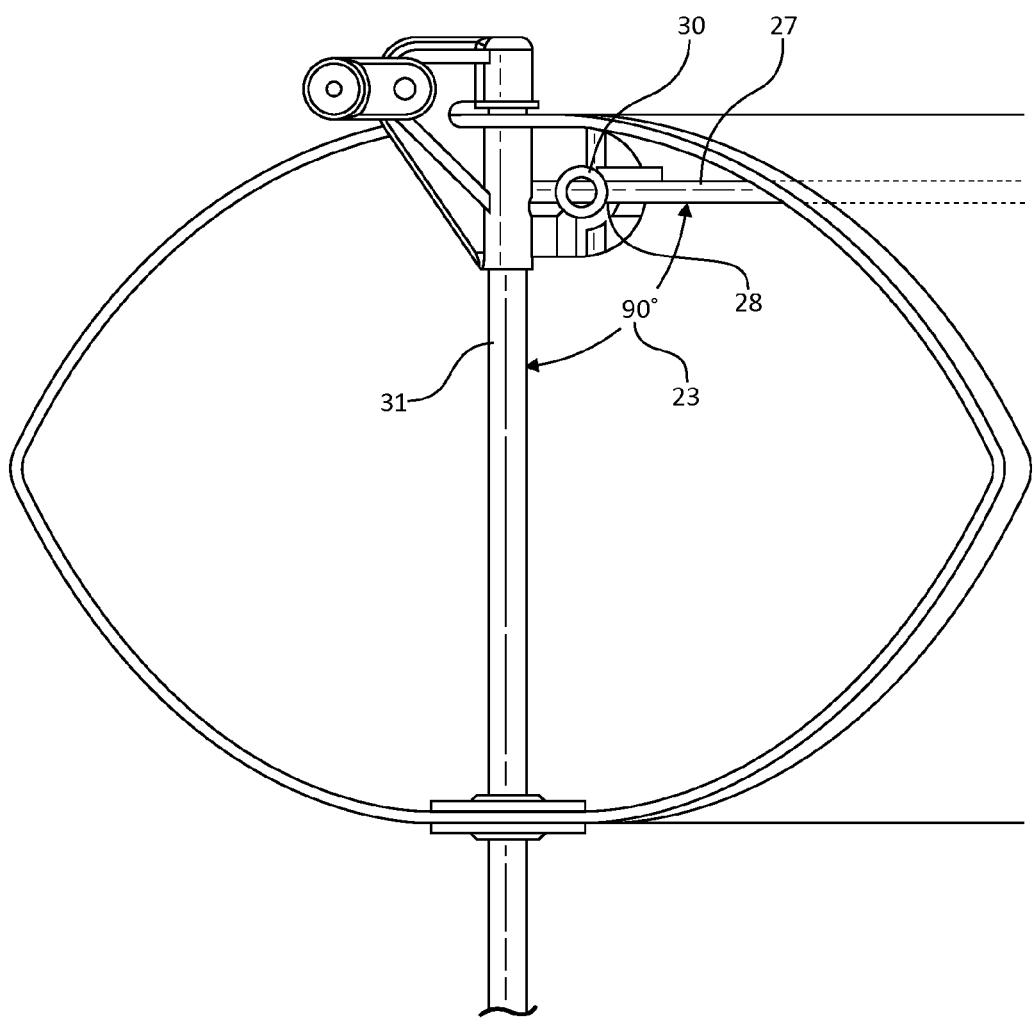
FIG. 4 is a front-view of a windsock decoy apparatus with a hinging mechanism in the open position, showing the horizontal windsock support structural member, the two-piece molded hinging mechanism, and a set of two rubber washers to secure the windsock on the vertical anchoring shaft.

In the embodiment pictured in FIG. 4, the horizontal windsock support structural member 27 has been rotated to the open position 28. The side, close-up view of the hinging mechanism 30 depicts the perpendicular orientation 23 of the horizontal windsock support structural member 27 to the vertical shaft 31 in the open position.

Figure 5:
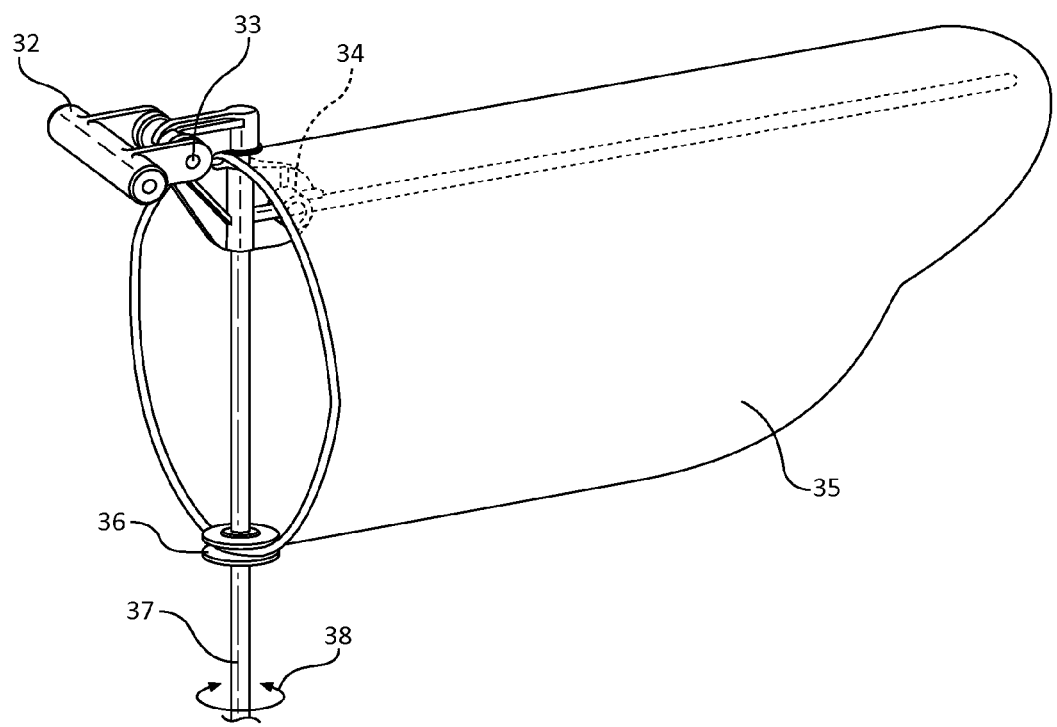
FIG. 5 is a side view of a windsock decoy apparatus with a locking hinging mechanism in the open position.

The decoy head fixation means 32 is located in a position at the top 33 of the hinging mechanism 34 so as not to obstruct the opening of the windsock. The result is the inflation of the windsock 35 by a prevailing wind, simulating the plump body of a snow goose as shown in FIG. 5. The rubber washers 36 that secure the windsock 35 to the vertical shaft 37 act as a supporting means to display the windsock 35 in the absence of a prevailing wind. This exposes a large surface of the windsock to the wind, acting as a sail and causing the entire apparatus to rotate 38 into the direction of a sufficient prevailing wind. With winds of lesser magnitude, the tail 29 of the windsock will "waddle" the width of tail 29 independent of the rotation 38 of the apparatus.

Figure 6:
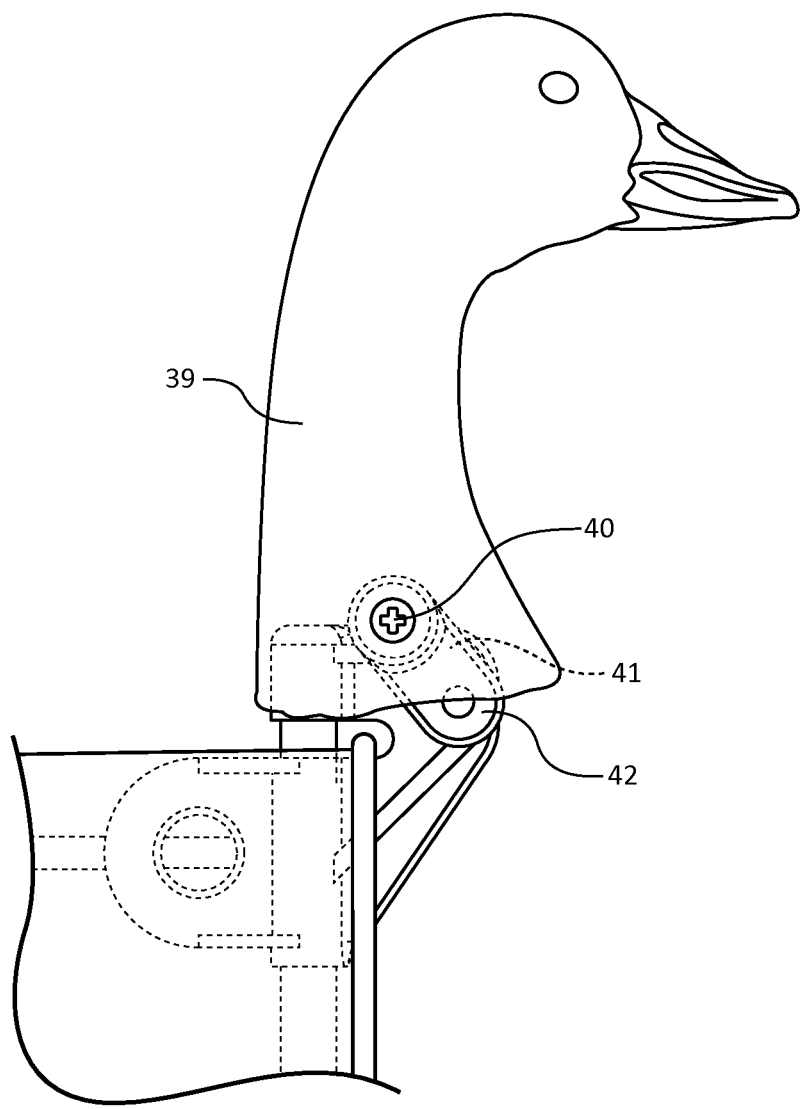
FIG. 6 is a side view of an after-market decoy head attached to a decoy head fixation means coupled to a hinging mechanism.

A decoy head 39 constructed from injection-molded plastic and available as an after-market accessory is shown attached to the decoy head fixation means 41 in FIG. 6. In this illustration, the molded duck head 39 is held in place by a machine screw and bolt 40 through the outside width of the head and a cross-section of the decoy head fixation means 41. The decoy head fixation means 41 of the exemplary embodiment is coupled to the hinging mechanism 42 through a machine screw and bolt, not shown in this projection.

Figure 7:
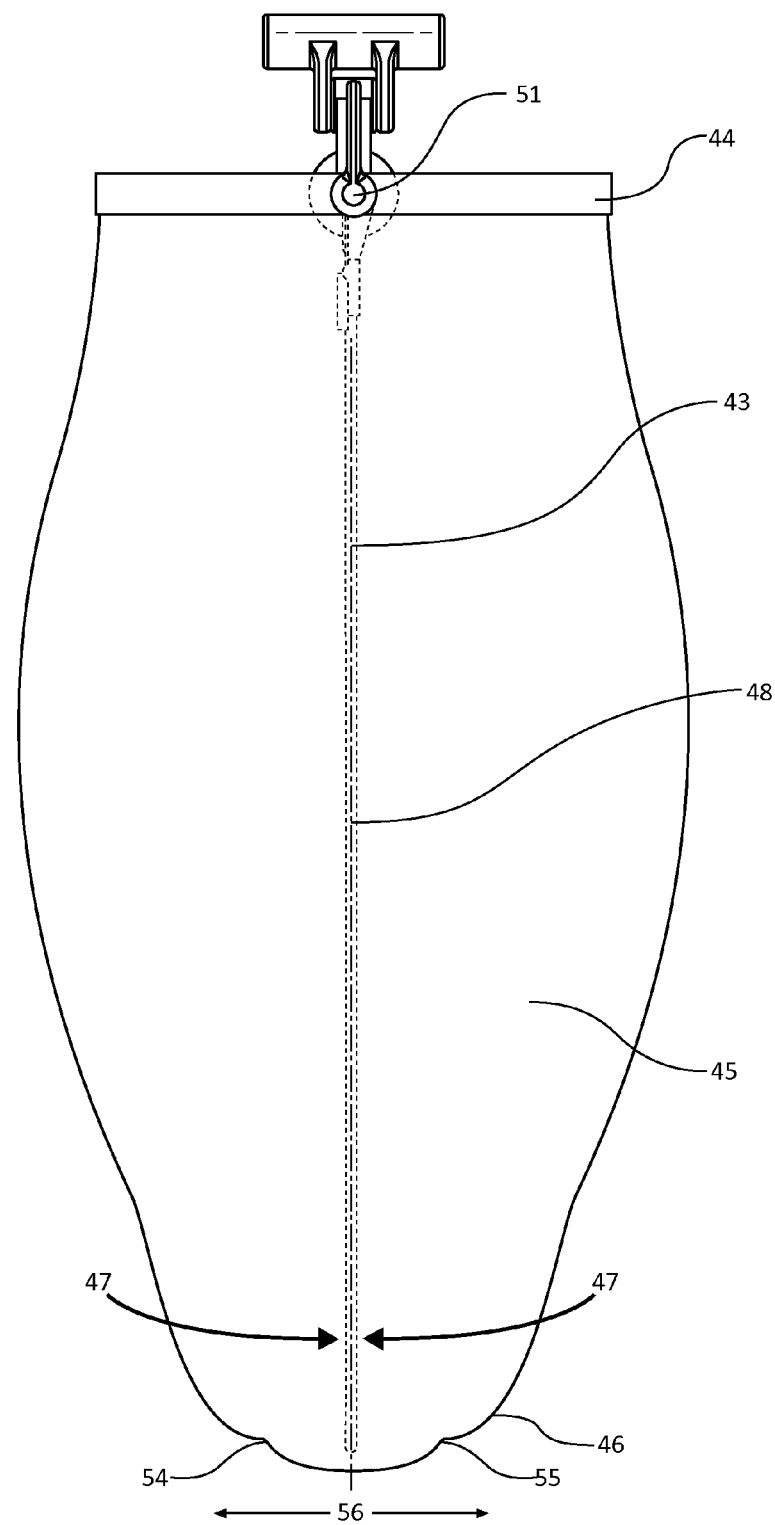
FIG. 7 is a top view of a windsock with an open inlet and a closed, tapered tail section secured to a hinging mechanism.

An example embodiment of a windsock decoy 43 with a narrow inlet 44, a widening body 45, and a tapered tail 46 is shown in FIG. 7. The tail section 46 narrows so that when the windsock apparatus moves side-to-side 47, the movement is limited by the horizontal windsock support structural member 48 on the inside of the windsock apparatus. The inlet 44 is secured at its top 49 to the hinging mechanism and at its bottom (not shown) to the vertical shaft 51 with rubber washers (See elements 4, 5 of FIG. 1). Firmly securing the inlet 44 without securing the tail 46 of the windsock is the method of providing the waddle action in the wind. As a wind inflates the windsock, the wind whips the windsock across the horizontal windsock support structural member 48 without moving the entire apparatus or rotating the vertical shaft 51 in the ground. The horizontal windsock support structural member 48 then strikes and rebounds at the left 54 and right 55 corners of the windsock. The windsock is neither threaded over nor secured in any way to the horizontal windsock support structural member 48. This lack of threading and lack of attachment to the horizontal support structural member 48, but affixing the inlet 44 to the vertical shaft 51 is the mechanical framework for simulating a life-like, side-to-side waddle in the presence of wind. The width of the waddle is dependent on the dimension of the tail width 56. A windsock tail width 56 that is seven inches wide encourages a windsock to waddle in the wind. This limits the rotation to seven inches from 0 degrees before a corner of the windsock apparatus collides with the horizontal windsock support structural member 48. The windsock depicted in FIG. 7 is constructed from Tyvek™ with a printed design to better resemble a live bird.

Figure 8:
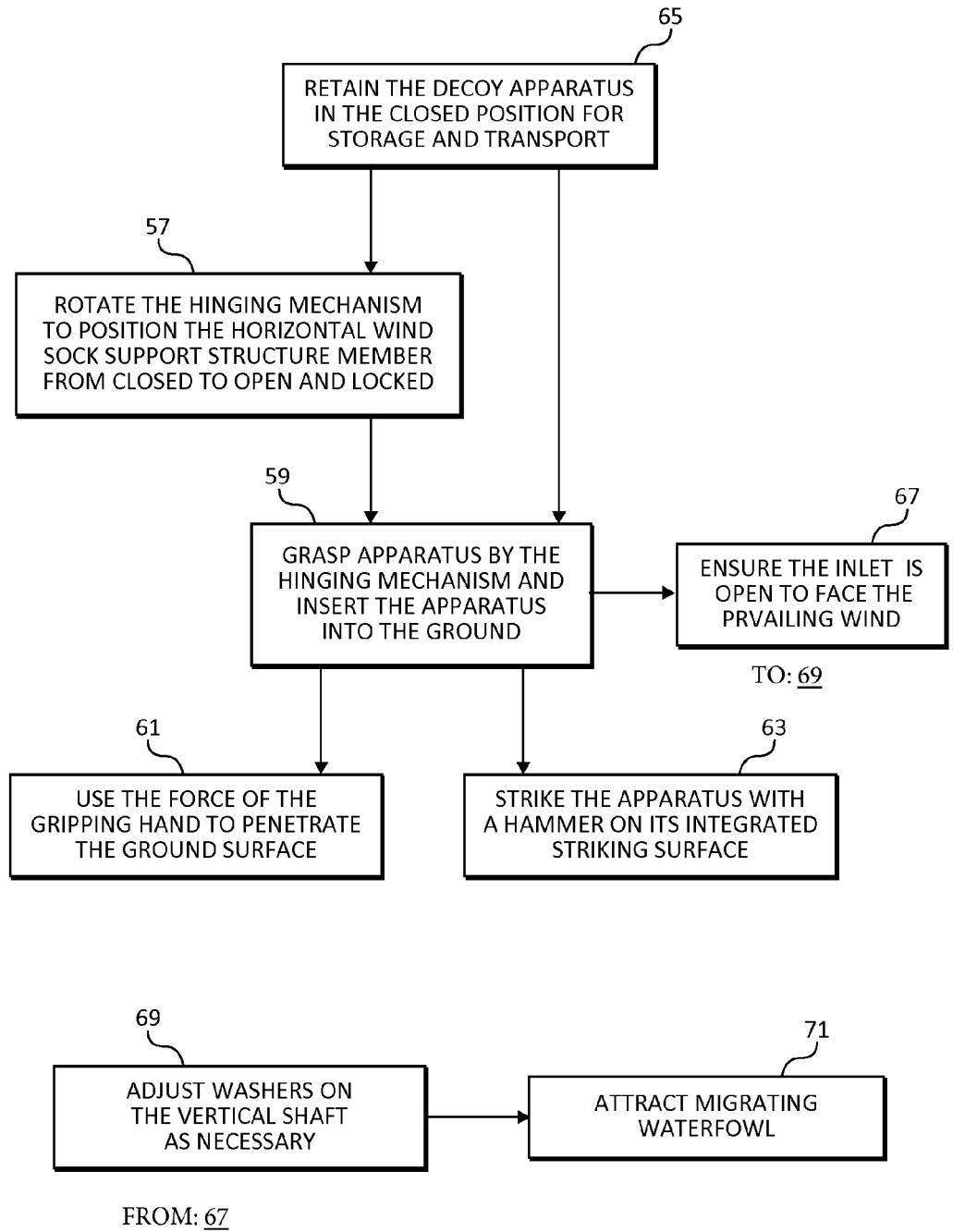
FIG. 8 is a flowchart describing a method of using a collapsible windsock decoy apparatus.

The method of using the presently disclosed waterfowl decoy apparatus is depicted as a flow chart in FIG. 8. A user initiates the deployment process by rotating the horizontal windsock support structural member attached to the hinging mechanism from the closed position to an open position with a locking positive stop 57. Secondly, the user grasps the hinging mechanism around its bulk, without contacting the horizontal windsock support structural member, the vertical shaft, the decoy head fixation means, or a printed fabric windsock installed on the horizontal windsock support member and inserts the vertical shaft into the ground surface 59. The insertion may be accomplished by pushing the apparatus into the ground by hand 61, or with the use of a hammer contacting the integrated striking surface of certain embodiments 63. Alternatively, prior to the ground insertion 61, 63, the horizontal windsock support structural member and coupled windsock are locked in the closed position 65 and rotated open once the vertical shaft is in the ground. The user then verifies the inlet to the windsock is sufficiently open to catch a prevailing wind 67. The inlet opening may be adjusted by sliding the washers down the length of the vertical shaft, as necessary 69. The apparatus is now ready to attract migrating waterfowl 71. Repeat the method steps of FIG. 8 for the desired number of waterfowl windsock decoy apparatuses.

What is claimed is:

1. A waterfowl decoy apparatus comprising:
   A vertical shaft;
   A hinging mechanism connected to the vertical shaft, the hinging mechanism movable between a deployed position and a closed position;
   a windsock support structural member having a first end pivotally connected to the hinging mechanism; and
   a windsock slidably connected to the windsock support structural member, wherein, when the hinging mechanism is in the deployed position at least one of the windsock support structural member and the windsock is perpendicular to the vertical shaft, and when the hinging mechanism is in the closed position at least one of the windsock support structural member and windsock is parallel to the vertical shaft.

2. The apparatus according to claim 1 wherein the hinging mechanism has an integrated striking surface in a vertical plane with the vertical anchoring shaft.

3. The apparatus according to claim 1 wherein the hinging mechanism has two pieces connected by a mechanical rotation means to rotate between a deployed and a stowed position.

4. The apparatus according to claim 3 wherein the mechanical rotation means is one of the group consisting of: machine screws, cap screws, shoulder screws, captive panel screws, ball screws, nails, threaded bolts, T-handle bolts, binding posts, ball bearings, collar bearings, axle shafts in collars, rotary actuators, threaded rods, screw conveyors, pipes and pipe hangars, and pipes in bores.

5. The apparatus according to claim 1 wherein the hinging mechanism has a decoy head fixation means.

6. The apparatus according to claim 1 where the decoy head fixation means is connected to the hinging mechanism through a mechanical rotation means.

7. The apparatus according to claim 1 wherein a locking means for the hinging mechanism are two positive stops molded into the structure of the hinging mechanism.

8. A method of deploying a waterfowl windsock decoy apparatus having a vertical shaft, a hinging mechanism, a horizontal windsock support structural member, a decoy head fixation means, and a printed fabric windsock, the method comprising;
  rotating the horizontal windsock support structural member attached to the hinging mechanism from the closed position to an open position with a locking positive stop;
  grasping a hinging mechanism around its bulk, without contacting the horizontal windsock support structural member, the vertical shaft, the decoy head fixation means, or a printed fabric windsock installed on the horizontal windsock support member;
  inserting the vertical shaft into a ground surface;
  verifying an inlet to the printed fabric windsock is sufficiently open to catch a prevailing wind;
  adjusting the inlet by moving a retaining means of the printed fabric windsock when necessary;
  repeating the above steps for the remaining waterfowl windsock decoy apparatuses.

9. The method according to claim 8 wherein the insertion of the vertical shaft into the ground is accomplished by striking an integrated striking surface of the hinging mechanism with a hammer.

10. The method according to claim 8 wherein the insertion of the vertical shaft into the ground is accomplished by grasping the hinging mechanism by a decoy head fixation means.

11. The method according to claim 10 where the decoy head fixation means is coupled to the hinging mechanism through a mechanical rotation means.

12. The method according to claim 8 wherein the decoy apparatus is inserted into a ground surface with a hinging mechanism coupled to a horizontal windsock support structural member;
  the hinging mechanism is in a locked, closed, position;
  the vertical shaft is inserted into a ground surface by grasping a hinging mechanism around its bulk while;
  lastly, the horizontal windsock support structural member attached to the hinging mechanism is rotated from a closed position to an open position with a locking positive stop.

* * * * *